Sept. 13, 1949.   E. C. WAHLBERG   2,482,082
SCREW JACK

Filed June 7, 1944   3 Sheets-Sheet 1

INVENTOR.
Eric C. Wahlberg
BY Thomas C. Beth
His Attorney

Sept. 13, 1949.  E. C. WAHLBERG  2,482,082
SCREW JACK

Filed June 7, 1944  3 Sheets-Sheet 2

INVENTOR.
Eric C. Wahlberg
BY Thomas C. Betts
His Attorney

Sept. 13, 1949. E. C. WAHLBERG 2,482,082
SCREW JACK
Filed June 7, 1944 3 Sheets-Sheet 3

INVENTOR.
Eric C. Wahlberg
BY Thomas C. Betts
His Attorney

Patented Sept. 13, 1949

2,482,082

UNITED STATES PATENT OFFICE 2,482,082

SCREW JACK

Eric C. Wahlberg, Stamford, Conn., assignor to Electrolux Corporation, Old Greenwich, Conn., a corporation of Delaware Application June 7, 1944, Serial No. 539,159

16 Claims. (Cl. 74—459)

My invention relates to improvements in screw jacks and devices of similar nature.

One of the objects of my invention is to provide a screw jack in which sliding friction between the nut structure and the screw is eliminated in order to very greatly reduce friction between these parts and hence to increase the mechanical efficiency.

Another object of my invention is to provide a highly efficient screw jack of reasonably small size which is able to withstand large loads.

Further objects and advantages of my invention will be apparent from the following description, considered in connection with the accompanying drawings, which form a part of this specification and of which:

Figure 1:
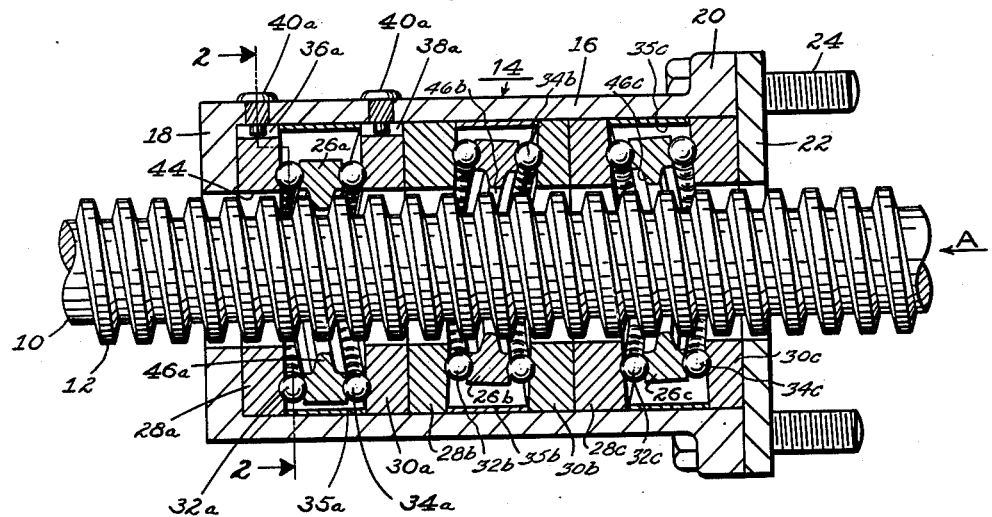
Fig. 1 is a cross-sectional view showing one embodiment of my invention, and is taken on the line 1—1 of Fig. 2.
Figure 2:
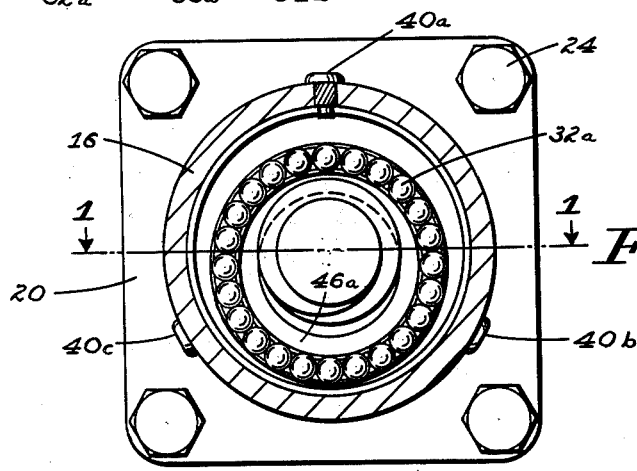
Fig. 2 is a cross-sectional view taken on the line 2—2 of Fig. 1.
Figure 3:
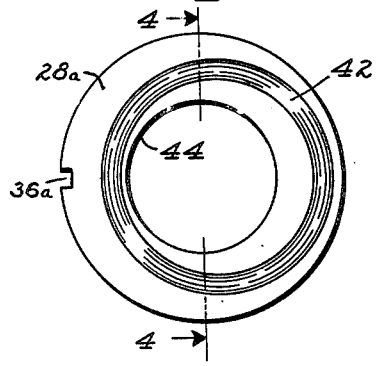
Fig. 3 is an end view of an element forming part of the structure shown in Figs. 1 and 2.

Referring more particularly to Figs. 1 through 4, reference character 10 designates a screw having a helical thread 12 formed thereon. This screw extends through a nut structure designated generally by reference character 14. This structure includes a cylindrical casing 16 closed at one end by a wall 18 and having a flange 20 at the other end. An end plate 22 is bolted to flange 20 by means of bolts 24, which may also serve to secure the nut structure to any desired support. The casing 16, end wall 18 and plate 22 constitute a retaining member.

Figure 4:
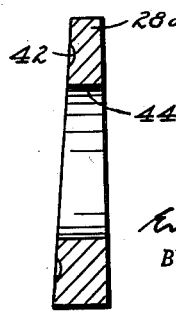
Fig. 4 is a cross-sectional view taken on the line 4—4 of Fig. 3.

Within the casing 16 there is a plurality of rings 26a, 26b and 26c. Ring 26a is rotatably mounted between thrust plates 28a and 30a by means of ball bearings 32a and 34a, respectively. The thrust plates 28a and 30a are maintained in proper spaced relationship by means of a distance sleeve 35a. These plates have a snug fit within the housing 16 and are provided at their peripheries with keyways 36a and 38a which receive drive screws 40a driven through suitable apertures in the casing, these drive screws serving to prevent rotation of the thrust plates. As is shown more clearly in Figs. 3 and 4, one face of each thrust plate is formed with a ball race 42 which is eccentric with respect to the central opening 44 of the disc and hence with respect to the axis of screw 10. The face of the plate in which this race is formed is disposed at an angle with respect to the opposite face, the plate being wedge shaped, as is shown in Fig. 4. The opposite face is normal to the axis of the opening 44 and to the axis of the screw 10. The ball races formed in the opposite sides of the ring 26a are concentric with respect to this ring, and hence, due to the eccentricity of the ball races 42 in the thrust plates, the ring 26a is mounted eccentrically with respect to the screw 10. This ring is formed with an inner annular rib 46a which in cross section has a profile similar to that of a gear tooth. The eccentric mounting of this ring is such that this rib is disposed between and engages adjacent turns of the thread 12 on one side of the screw, and is clear of the threads on the other side.

The ring 26b, thrust plates 28b and 30b and distance sleeve 35b are identical with those above described, but the apertures in the housing 16 through which the drive screws 40b are driven are disposed 120° from the apertures which receive the drive screws 40a. Consequently, the rib 46b on the ring 26b is disposed between adjacent turns of the thread 12 at a point spaced 120° from that at which the rib 46a on the ring 26a is between the threads. In a similar manner, the apertures in the casing 16 which receive the drive screws 40c for retaining the thrust plates 28c and 30c in place are disposed 120° from the apertures receiving the drive screws 40a and 40b. Consequently, the rib 46c on the ring 26c enters the thread 12 120° away from the points at which the ribs 46a and 46b enter the thread. In other words, the rings 46a, 46b and 46c engage the thread 12 at points disposed 120° apart and hence provide support for the screw 10 at points equally spaced around its circumference.

The flat face of thrust plate 30a abuts the flat face of plate 28b, and the flat faces of plates 30b and 28c are in abutting relation. The length of the housing 16 is such that the assemblage of thrust plates and distance sleeves is clamped tightly between the end wall 18 and the end plate 22 when the latter is tightened down by the bolts 24.

The angle formed between the opposite faces of the thrust plates, and hence the angle at which the rings 26a, 26b and 26c are maintained with respect to the axis of the screw is such, with respect to the helix angle of the thread 12, that the ribs 46a, 46b and 46c are substantially parallel to the face of the thread 12 at their respective points of contact.

The operation of the above-described device is as follows, it being assumed that the nut structure 14 is maintained stationary and the screw 10 is rotated and subjected to axial thrust in either direction, for instance in the direction of the arrow A.

Rotation of the screw causes the several rings 46a, 46b and 46c to rotate in the same direction, the face of the thread 12 thus rolling on the faces of the ribs 46a, 46b and 46c. The rings in turn roll on the ball bearings which run in the races formed in thrust plates. Thus, all sliding friction between the screw and the nut structure is eliminated, there being nothing but rolling friction. Thrust applied to the screw in the direction of the arrow A is transmitted from the left face of the thread 12 to the right face of the ribs 46a, 46b and 46c of the several rings, and from these rings is transmitted through the ball bearings 32a, 32b and 32c to the thrust plates 28a, 28b and 28c. Thrust thus applied to plate 28c is transmitted to plate 30b and thence through distance sleeve 35b to plate 28b. Thrust applied to the latter plate, both from the ring 26b and the sleeve 35b, is transmitted to plate 30a thence through distance sleeve 35a to plate 28a. All of the thrust received by plate 28a is transmitted directly to the end wall 18 of the casing. Obviously, thrust in the opposite direction is transmitted in a similar way through the ball bearings 34a, 34b and 34c to the thrust plates 30a, 30b and 30c and from these plates to the casing.

The embodiment of my invention illustrated in Figs. 5 through 8 differs from that previously described in that four rings, instead of three, are provided for engaging the screw, and a different arrangement for rotatably mounting these rings is employed. As will be seen particularly from Fig. 5, these rings are designated by reference characters 50a, 50b, 50c and 50d. As was the case in the previous embodiment, each ring is formed with an internal rib 52. The outer surface of each ring is formed as the inner race of a ball bearing. The outer race of each bearing constitutes a pair of annular plates 54 and 56. The central opening 58 in each of these plates is eccentrically located with respect to the outer periphery and is formed with one half of a ball race 60. Consequently, when the plates 54 and 56 are placed face to face, the two halves 60 form a complete outer race for the bearing balls 62. The outer periphery of each of the plates is formed with a keyway 64 which receives a drive screw 66 driven through an aperture formed in the cylindrical wall 16 of the housing 14. As appears more particularly from Fig. 8, the thrust plates are wedge shaped in cross section and the ball races 60 are formed in the inclined faces of the plates. Consequently, the rings are supported by the ball bearings at an angle to the axis of the screw 10 such that the ribs 52 are substantially parallel to the thread 12 at the points of contact between the ribs and the thread.

The various pairs of plates 54 and 56 are identical, but the openings in the housing 14 for the drive screws 66 are disposed at 90° with respect to each other. Consequently, the ribs 52 engage the thread 12 at points spaced equidistantly around the circumference of the screw 10.

The operation of this embodiment is substantially the same as that previously described. Rotation of the screw 10 causes the rings 50 to rotate on the ball bearing 62 and thrust imposed on the screw is transferred to the rings and thence through ball bearings to the plates 54 or 56, depending upon the direction of the thrust. From the plates the thrust is transmitted through abutting plates until it arrives at one or the other of the end walls of the housing.

Figure 5:
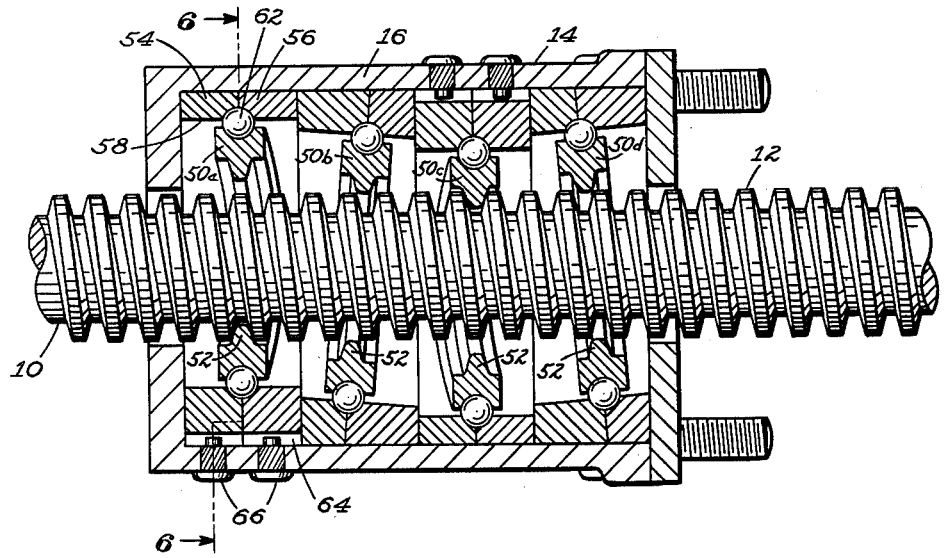
Fig. 5 is a cross-sectional view similar to Fig. 1, but showing another embodiment of my invention.
Figure 6:
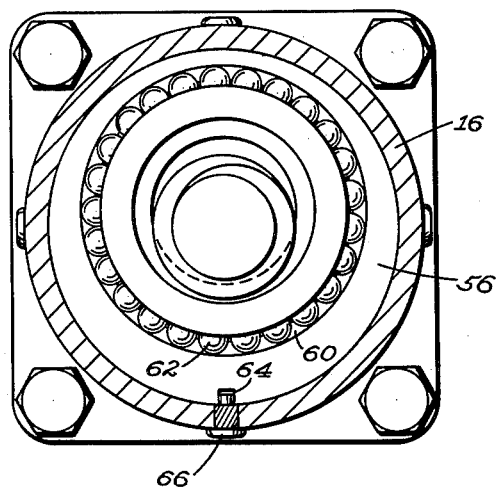
Fig. 6 is a cross-sectional view taken on the line 6—6 of Fig. 5.
Figure 7:
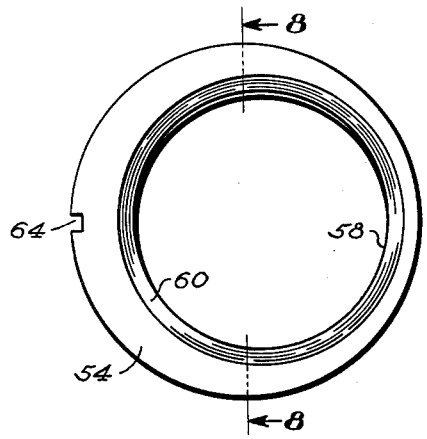
Fig. 7 is an end view of an element forming part of the structure shown in Figs. 5 and 6.
Figure 8:
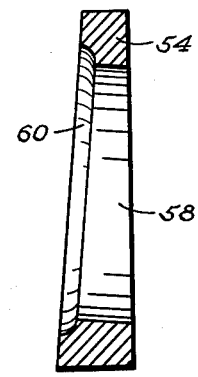
Fig. 8 is a cross-sectional view taken on the line 8—8 of Fig. 7.

It will be noted that the overall length of the nut structure of the embodiment shown in Fig. 5 is less than that of the embodiment shown in Fig. 1 for the same number of rings, or more rings may be accommodated in substantially the same space. This is due to the fact that in Fig. 5 the ball bearings are located between the outer peripheries of the rings and the inner peripheries of the thrust plates, while in Fig. 1 the bearings are between radial faces of the rings and the plates. However, this difference in location of the bearings results in the nut structure in accordance with Fig. 5 having a greater diameter than the other. Consequently, it depends to a great extent on space limitations which embodiment is better suited to a particular application.

Figure 9:
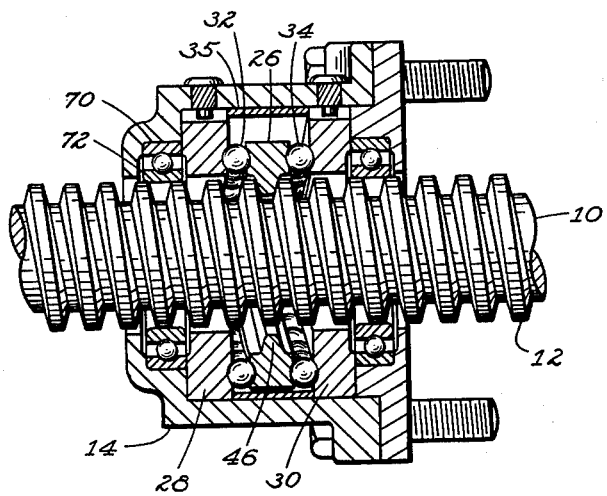
Fig. 9 is a cross-sectional view of a still further embodiment of my invention.

The embodiment illustrated in Fig. 9 is similar to that shown in Figs. 1 through 4, but only a single ring 26 is provided. This ring is rotatably mounted in the casing 14 by means of ball bearings 32 and 34 between thrust plates 28 and 30. Due to the fact that there is but a single ring 26 engaging the thread 12 of the screw 10, there is a tendency for the screw to be displaced laterally with respect to the ring. In the previous embodiments this side thrust has been balanced and neutralized by the provision of a plurality of rings engaging the screw at points spaced equidistantly around its circumference. In Fig. 9 the side thrust is absorbed by ball bearings located at each end of the housing. Each of these bearings includes an outer race 70 fixed in the end wall of the housing, and an inner race 72. The internal diameter of the inner race is substantially equal to the outer diameter of the thread 12 on the screw and consequently acts to center the screw with respect to the housing and hence maintains the thread 12 in engagement with the rib 46 on the ring 26. When the screw is rotated relative to the housing, the inner race 72 may rotate with the screw and the only sliding friction is that resulting from the advance of the screw through the housing and hence through the inner race. For most applications a plurality of rings is preferred, but the embodiment of Fig. 9 has the advantage that the housing 14 may be made relatively short, which is of importance where space is limited.

Screw jacks made in accordance with this invention have been found to operate with mechanical efficiencies in the neighborhood of 96% under full load. As will be seen from the foregoing examples, any number of rings may be employed, depending chiefly on the load which the device is required to carry.

While I have shown three more or less specific embodiments of my invention, it is to be understood that this has been done for the purpose of illustration only and that the scope of my invention is not to be limited thereto, but is to be determined from the appended claims.

What I claim is:

1. In a screw jack, a retaining member, a threaded screw of constant diameter axially movable within said member, a ring within said member encircling said screw, means for rotatably mounting said ring in said member eccentrically with respect to the axis of said screw and with the axes of the screw and ring in fixed relationship, and means disposed around the entire interior of said ring entering between and engaging adjacent turns of the thread on said screw.

2. In a screw jack, a retaining member, a threaded screw of constant diameter axially movable within said member, a ring within said member encircling said screw, means for rotatably mounting said ring in said member eccentrically and at a fixed angle with respect to the axis of said screw, and means disposed around the entire interior of said ring entering between and engaging adjacent turns of the thread on said screw, said angle being such that said means on the ring is substantially parallel to said thread where the last mentioned means engages the latter.

3. In a screw jack, a retaining member, a threaded screw of constant diameter axially movable within said member, a plurality of rings within said member encircling said screw, means for rotatably mounting said rings in said member eccentrically with respect to the axis of said screw and with the axes of the screw and rings in fixed relationship, the centers of the respective rings being substantially equidistantly spaced circumferentially about said axis, and an interior rib on each of said rings entering between and engaging adjacent turns of the thread on said screw.

4. In a screw jack, a retaining member, a threaded screw of constant diameter axially movable within said member, a plurality of rings within said member encircling said screw, means for rotatably mounting said rings in said member eccentrically and at a fixed angle with respect to the axis of said screw, the centers of the respective rings being substantially equidistantly spaced circumferentially about said axis, and an interior rib on each of said rings entering between and engaging adjacent turns of the thread on said screw, the angle between each of said rings and said axis being such that said ribs are substantially parallel to said thread where the respective ribs engage the latter.

5. In a screw jack, a retaining member, a threaded screw of constant diameter axially movable within said member, a ring within said member encircling said screw, means for rotatably mounting said ring in said member eccentrically with respect to the axis of said screw and with the axes of the screw and ring in fixed relationship, a continuous interior rib on said ring entering between and engaging adjacent turns of the thread on said screw, and anti-friction means for transmitting side thrust between said screw and said retaining member for maintaining said rib in engagement with said thread.

6. In a screw jack, a casing, a threaded screw of constant diameter axially movable within said casing, annular structure fixed within said casing and forming a ball race eccentric with respect to the axis of said screw, a ring encircling said screw and having an interior rib, a ball race formed in said ring concentric with said rib, and bearing balls engaging said races for rotatably mounting said ring eccentrically with respect to said screw and with the axes of the screw and ring in fixed relationship, the eccentricity being such that said rib enters between and engages adjacent turns of the thread on one side of said screw and is radially beyond the thread on the other side.

7. In a screw jack, a casing, a threaded screw of constant diameter axially movable within said casing, annular structure fixed within said casing and forming a ball race located eccentrically and at a fixed angle to the axis of said screw, a ring encircling said screw and having an interior rib, a ball race formed in said ring concentric with respect to said rib, and bearing balls engaging said races for rotatably mounting said ring eccentrically and at an angle with respect to said screw, the eccentricity being such that said rib enters between and engages adjacent turns of the thread on one side of the screw and is radially beyond the thread on the other side and the angularity being such that said rib is substantially parallel to said thread where the rib engages the latter.

8. In a screw jack, a casing, a threaded screw of constant diameter extending within said casing, a pair of thrust plates fixed within said casing, adjacent faces of said plates being parallel to each other and inclined with respect to the axis of said screw, bearing race means formed in the inclined faces of said plates and located eccentrically with respect to said axis, a ring encircling said screw and having an interior rib, bearing race means formed in said ring concentric with said rib, and bearing balls engaging said races for rotatably mounting said ring eccentrically and at a fixed angle with respect to said screw, the eccentricity being such that said rib enters between and engages adjacent turns of the thread on one side of the screw and is radially beyond the thread on the other side and the angularity being such that said rib is substantially parallel to said thread where the rib engages the latter.

9. In a screw jack, a casing, a threaded screw of constant diameter extending within said casing, a pair of thrust plates fixed in spaced relationship within said casing, adjacent faces of said plates being parallel to each other and inclined with respect to the axis of said screw, a bearing race formed in the inclined face of each plate and located eccentrically with respect to said axis, a ring encircling said screw between said plates and having an interior rib, a bearing race formed in each side of said ring concentric with said rib, and bearing balls engaging the races in said plates and said ring for rotatably mounting said ring eccentrically and at a fixed angle with respect to said screw, the eccentricity being such that said rib enters between and engages adjacent turns of the thread on one side of the screw and is radially beyond the thread on the other side and the angularity being such that said rib is substantially parallel to said thread where the rib engages the latter.

10. In a screw jack, a casing, a threaded screw of constant diameter extending within said casing, a pair of thrust plates fixed in abutting relationship within said casing, adjacent faces of said plates being parallel to each other and inclined with respect to the axis of said screw, said plates being formed with an opening eccentric with respect to said axis, a bearing race formed in said opening at the juncture of the inclined faces of said plates, a ring encircling said screw and having an interior rib, a bearing race formed in the outer periphery of said ring concentric with said rib, and bearing balls engaging said races for rotatably mounting said ring eccentrically and at a fixed angle with respect to said screw, the eccentricity being such that said rib enters between and engages adjacent turns of the thread on one side of the screw and is radially beyond the thread on the other side and the angularity being such that said rib is substantially parallel to said thread where the rib engages the latter.

11. In a screw jack, a casing, a threaded screw of constant diameter extending within said casing, a plurality of pairs of thrust plates fixed within said casing, adjacent faces of the plates of each pair being parallel to each other and inclined at a fixed angle with respect to the axis of said screw, the inclined faces of the plates of different pairs being disposed at an angle with respect to each other, the other face of each plate being normal to said axis and the normal faces of adjacent plates in adjacent pairs being in abutting relationship, bearing race means formed in the inclined faces of the plates of each pair and located eccentrically with respect to said axis, a plurality of rings encircling said screw, an internal rib on each ring, bearing race means formed in each ring concentric with the rib thereon, and bearing balls engaging said races for rotatably mounting a ring on each pair of plates eccentrically and at a fixed angle with respect to said screw, the eccentricity being such that each rib enters between and engages adjacent turns of the thread on one side of the screw and is radially beyond the thread on the other side, the different ribs engaging the thread at points substantially equidistantly spaced about the circumference of the screw, and the angularity being such that each rib is substantially parallel to said thread where the rib engages the latter.

12. In a screw jack, a casing, a threaded screw of constant diameter extending within said casing, a plurality of pairs of thrust plates fixed within said casing, the plates of each pair being fixed in spaced relationship and the adjacent faces of the plates of each pair being parallel to each other and inclined with respect to the axis of said screw, the inclined faces of the plates of different pairs being disposed at an angle with respect to each other, the other face of each plate being normal to said axis and the normal faces of adjacent plates in adjacent pairs being in abutting relationship, a bearing race formed in the inclined face of each plate and located eccentrically with respect to said axis, a plurality of rings encircling said screw, an internal rib on each ring, a bearing race formed in each side of each ring concentric with the rib thereon, and bearing balls engaging said races for rotatably mounting a ring between each pair of plates eccentrically and at a fixed angle with respect to said screw, the eccentricity being such that each rib enters between and engages adjacent turns of the thread on one side of the screw and is radially beyond the thread on the other side, the different ribs engaging the thread at points substantially equidistantly spaced about the circumference of the screw, and the angularity being such that each rib is substantially parallel to said thread where the rib engages the latter.

13. In a screw jack, a casing, a threaded screw of constant diameter extending within said casing, a plurality of pairs of thrust plates fixed within said casing, adjacent faces of the plates of each pair being parallel to each other and inclined with respect to the axis of said screw, the inclined faces of the plates of different pairs being disposed at an angle with respect to each other, the other face of each plate being normal to said axis, means for securing all of said plates in face to face abutting relationship, each of said plates being formed with an opening, the openings in the plates of each pair being concentric with each other and eccentric with respect to said axis and to the openings in the other pairs, a bearing race formed at the juncture of the inclined faces of each pair of plates, a plurality of rings encircling said screw, an internal rib on each ring, a bearing race formed in the outer periphery of each ring concentric with the rib thereon, and bearing balls engaging said races for rotatably mounting a ring within each pair of plates eccentrically and at a fixed angle with respect to said screw, the eccentricity being such that each rib enters between and engages adjacent turns of the thread on one side of the screw and is radially beyond the thread on the other side, the different ribs engaging the thread at points substantially equidistantly spaced about the circumference of the screw, and the angularity being such that each rib is substantially parallel to said thread where the rib engages the latter.

14. In a screw jack, a casing, a threaded screw of constant diameter extending within said casing, a pair of thrust plates secured within said casing, a sleeve between said plates for maintaining them in fixed spaced relationship, adjacent faces of said plates being parallel to each other and inclined at a fixed angle with respect to the axis of said screw, a bearing race formed in the inclined face of each plate and located eccentrically with respect to said axis, a ring encircling said screw between said plates and having an interior rib, a bearing race formed in each side of said ring concentric with said rib, and bearing balls engaging the races in said plates and said ring for rotatably mounting said ring eccentrically and at an angle with respect to said screw, the eccentricity being such that said rib enters between and engages adjacent turns of the thread on one side of the screw and is radially beyond the thread on the other side and the angularity being such that said rib is substantially parallel to said thread where the rib engages the latter.

15. In a screw jack, a casing, a threaded screw of constant diameter extending through said casing, a plurality of pairs of thrust plates secured within said casing, a sleeve between the plates of each pair for maintaining them in fixed spaced relationship, adjacent faces of the plates of each pair being parallel to each other and inclined with respect to axis of said screw, the inclined faces of the plates of different pairs being disposed at an angle with respect to each other, the other face of each plate being normal to said axis and the normal faces of adjacent plates in adjacent pairs being in abutting relationship, a bearing race formed in the inclined face of each plate and located eccentrically with respect to said axis, a plurality of rings encircling said screw, an internal rib on each ring, a bearing race formed in each side of each ring concentric with said rib, and bearing balls engaging said races for rotatably mounting a ring between each pair of plates eccentrically and at a fixed angle with respect to said screw, the eccentricity being such that each rib enters between and engages adjacent turns of the thread on one side of the screw and is radially beyond the thread on the other side, the different ribs engaging the thread at points substantially equidistantly spaced about the circumference of the screw, and the angularity being such that each rib is substantially parallel to said thread where the rib engages the latter.

16. In a screw jack, a retaining member, a threaded screw of constant diameter axially movable within said member, a ring within said member encircling said screw, means for rotatably mounting said ring in said member eccentrically with respect to the axis of said screw and with the axes of screw and ring in fixed relationship, an interior rib on said ring entering between and engaging adjacent turns of the thread on said screw, and an anti-friction bearing having an outer race supported in said retaining member and an inner race engaging the top of said screw thread for transmitting side thrust between said screw and said retaining member for maintaining said rib in engagement with said thread.

ERIC C. WAHLBERG.

REFERENCES CITED

The following references are of record in the file of this patent:

UNITED STATES PATENTS

| Number | Name | Date |
|---|---|---|
| 825,151 | McLean | July 3, 1906 |
| 1,071,213 | Crabb | Aug. 26, 1913 |
| 1,140,606 | Abernathy | May 25, 1915 |
| 1,958,424 | Gebhard | May 15, 1934 |
| 2,062,132 | Jordan | Nov. 24, 1936 |
| 2,134,748 | Baxter | Nov. 1, 1938 |